Dec. 19, 1933.       R. McLAUGHLIN       1,940,058
APPARATUS FOR ASCERTAINING WEIGHT OF MATERIALS
Filed Aug. 13, 1932
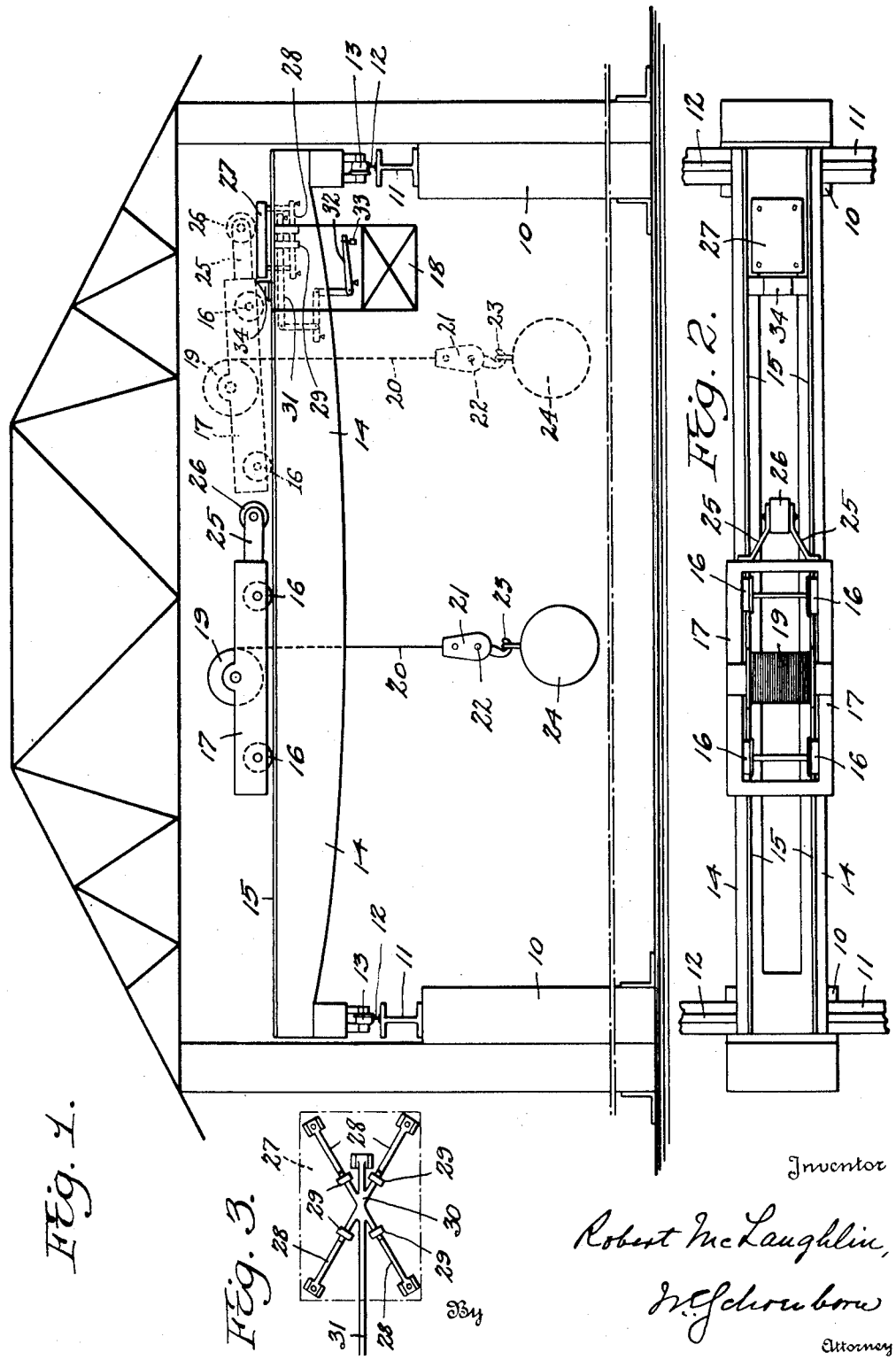

Patented Dec. 19, 1933

1,940,058

UNITED STATES PATENT OFFICE 1,940,058

APPARATUS FOR ASCERTAINING WEIGHT OF MATERIALS

Robert McLaughlin, Philadelphia, Pa.

Application August 13, 1932. Serial No. 628,722

9 Claims. (Cl. 212—2)

This invention relates to apparatus for ascertaining the approximate weight of materials being handled by a traveling crane.

The principal object of the invention is to provide apparatus for use in connection with the load of a traveling crane whereby its approximate weight may be quickly, easily and accurately determined. While it is not claimed that apparatus constructed in accordance with this invention will function with micrometer accuracy, the margin of error is, however, so small as to be negligible for all practical purposes.

Another object of the invention is to provide apparatus of the character described wherein the tension of but a certain predetermined proportion of the entire load will be imparted to the weight recording means so that the latter need not be of such massive character as though the full tension was imparted thereto.

A further object of the invention is to provide apparatus of the character described which will be possessed of but a minimum number of parts and consequent economy of manufacture.

With these and other objects in view, as will hereinafter be made manifest, the invention resides, in general, in the manner of operation, structural characteristics and combinations of elements illustrated in the accompanying sheet of drawing, described in the following specification and specifically pointed out in the appended claims.

In the drawing, wherein like characters of reference indicate like parts in the several views, Figure 1 is a side elevation, somewhat diagrammatic in nature, of a traveling crane and attendant weight indicating apparatus constructed in accordance with and embodying the principles of this invention;

Figure 2 is a top plan view of the same; and,

Figure 3 is a top plan view, on a somewhat larger scale, illustrating a portion of the weight indicating apparatus employed.

Referring, in the first instance, to Figure 1 of the drawing, there is shown a crane house wherein side pillars 10 support track girders 11 of a crane runway. Mounted upon the girders 11 are rails 12 for the reception and guidance of wheels 13 of a crane bridge 14, the latter, in turn, being provided with rails 15 for the supporting wheels 16 of a trolley 17.

Suspended from the bridge 14 at a point adjacent one end of the same is the customary operator's cage 18, and mounted upon and carried by the trolley 17, in the usual manner, is a winding drum 19 for a suspension cable 20. The ways in which the bridge, the trolley and the drum are controlled and operated from the operator's cage form no part of this invention and no effort is made toward illustration of the same.

Secured to the lower end of the suspension cable 20 is a suspension block 21 and pivotally mounted to this block, at 22, is a hook 23 for engagement with the crane load. While this load may be of any nature, such as a pot or ladle for the reception and transortation of molten metal, a casting, a piece of machinery, or any other article of a kind adapted to be handled by a traveling crane, it is merely conventionally indicated at 24 in the drawing, for the purpose of illustration.

Projecting from one end of the trolley 17 are a pair of brackets 25 at the outer end of which is mounted a centrally disposed wheel 26, and at one end of the bridge 14 and above the level of the rails 15 is positioned the weighing platform 27 of certain scale mechanism. While this scale mechanism, in itself, forms no part of this invention and may be of any desired type, it has been found that the form illustrated gives very satisfactory results. In this form, the platform 27 is mounted at its four corners upon the outer ends of levers 28, the inner ends of which engage through the medium of suspension links 29 with the arms of a spider head 30 formed adjacent the pivotally mounted end of a lever 31. The outer end of this lever is connected, by suitable linkage, with a pivotally mounted indicating beam 32 having a counter balance weight 33 and so positioned as to be readily accessible to the operator in the cage 18.

In order to weigh the load 24, the trolley 17 is run to the end of the bridge and the wheel 26 rides up on the weighing platform 27, as shown by dotted line in Figure 1. In order to facilitate this, near the inner edge of said platform 27 is, preferably, provided a bevel 34 secured to the rails 15, as shown in Figure 1, so that there will be no bump or jar as the wheel rides up on the platform. When the trolley is in this position, the inner set of wheels 16 have been lifted from the rails 15, as shown by the dotted lines, and the trolley is supported upon the outer set of wheels 16 and upon the wheel 26. The proportions of the trolley in respect to its wheels and the suspension point of the load may be in any desired ratio. In the present instance, it is shown as two to one, that is, two-thirds of the weight is supported upon the wheels 16 and one-third upon the wheel 26.

The operator then adjusts the scale mechanism to secure a balanced condition and takes a reading from the indicating beam 32. Let it be assumed that this reading is two thousand six hundred twenty (2620) pounds. The operator will then know that the total weight is three times that amount, or 7860 pounds. Let it be further assumed that the weight of the unloaded trolley and attendant parts is known to be 1300 pounds. This, subtracted from the ascertained weight of 7860 pounds, leaves 6560 pounds as the weight of the load 24.

Of course, many modifications and alterations in form, size and design of the parts will readily suggest themselves to those skilled in the art. Such changes are contemplated as forming a part of this invention insofar as they fall within the scope of the following claims.

What I claim is:

1. The combination, in a traveling crane, of a bridge a wheeled trolley movable thereon, a supplementary wheel on said trolley which is normally supported free from contact with said bridge, and scale mechanism having a weighing platform adapted to sustain said supplementary wheel and thereby support one end of said wheeled trolley free of said bridge.

2. The combination recited in claim 1, wherein the weighing platform of said scale mechanism is located at one end of said bridge.

3. The combination recited in claim 1, wherein the weighing platform of said scale mechanism is located at one end of and above said bridge.

4. The combination recited in claim 1, wherein said scale mechanism is carried by said bridge.

5. The combination recited in claim 1, wherein said bridge and the weighing platform of said scale mechanism are so positioned in respect to each other that when said supplementary wheel is sustained by said platform, the adjacent end of said trolley is lifted clear from contact with said bridge.

6. The combination, in a traveling crane, of a bridge, a wheeled trolley movable thereon and having means to engage and support a load, a supplementary wheel on said trolley which is normally supported free from contact with said bridge and rigidly secured to the said trolley, and weighing means adapted to be engaged and to support said supplementary wheel, and one end of said trolley to measure the weight of a predetermined proportion of the load supported by said wheeled trolley.

7. The combination, in a rail track, of a wheeled truck adapted to carry a load and movable on said track, a supplementary wheel on said truck which is normally supported free from contact with an extraneous body and rigidly secured to and projecting from said truck, and weighing means adjacent to said track adapted to be engaged and to support said supplementary wheel, and one end of said truck, against the action of gravity, to measure the weight of a predetermined proportion of the load carried by said truck.

8. The combination, in a wheeled truck adapted to carry a load, a supplementary wheel on said truck which is normally supported free of contact with an extraneous body and rigidly secured to and projecting from said truck, and weighing means adapted to be engaged and to support said supplementary wheel and a section of said truck, against the action of gravity, to measure the weight of a predetermined proportion of the load carried by said truck.

9. The combination, in a movable platform adapted to carry a pendulous load suspended from a fixed point from said platform, an extension of fixed length rigidly projecting from said platform, and a weighing mechanism independent of and exterior of said platform including an element on to which said extension is adapted to be moved to support said extension and a section of said platform against the action of gravity to measure the weight of a predetermined proportion of the entire load carried by said platform.

ROBERT McLAUGHLIN.